United States Patent
Macron et al.

(10) Patent No.: US 8,594,954 B2
(45) Date of Patent: Nov. 26, 2013

(54) METHOD OF ESTIMATING THE VOLUME OF A PRESSURIZED GAS CONTAINER

(75) Inventors: Jonathan Macron, Paris (FR); Loïc Damongeot, Valenton (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 499 days.

(21) Appl. No.: 12/844,219

(22) Filed: Jul. 27, 2010

(65) Prior Publication Data
US 2011/0022337 A1    Jan. 27, 2011

(30) Foreign Application Priority Data
Jul. 27, 2009  (FR) ...................................... 09 55230

(51) Int. Cl.
*G01F 17/00*   (2006.01)
(52) U.S. Cl.
USPC ................ 702/55; 702/50; 702/98; 702/138; 702/156; 141/3; 141/4; 141/18; 222/71; 73/1.73; 73/149; 73/299; 73/861
(58) Field of Classification Search
USPC .............. 702/50, 55, 98, 100, 137, 156, 138; 141/3, 4, 18; 222/71; 73/1.73, 149, 73/299, 861
See application file for complete search history.

(56) References Cited

U.S. PATENT DOCUMENTS

| | | | |
|---|---|---|---|
| 5,479,966 A | 1/1996 | Tison et al. | |
| 5,570,729 A | 11/1996 | Mutter | |
| 5,628,349 A * | 5/1997 | Diggins et al. | 141/3 |
| 5,771,948 A | 6/1998 | Kountz et al. | |
| 5,868,176 A | 2/1999 | Barajas et al. | |

FOREIGN PATENT DOCUMENTS

| | | |
|---|---|---|
| DE | 10218678 | 11/2002 |
| EP | 1 693 611 | 8/2006 |
| WO | WO 2005/080201 | 9/2005 |

OTHER PUBLICATIONS

FR 0955230 Search Report, mailed Feb. 11, 2010.
FR 0955229 Search Report, mailed Feb. 8, 2010.

\* cited by examiner

*Primary Examiner* — Alexander H Taningco
*Assistant Examiner* — Paul D Lee
(74) *Attorney, Agent, or Firm* — Christopher J. Cronin

(57) ABSTRACT

Method of estimating the volume (Vtk) of a tank (1), comprising:
  a step of calculating the volume (Vtk) of the tank (1) by applying the law of conservation of enthalpy (H) of the gas, considering that the transfer of the checking stream of gas is adiabatic ($Ttk(t1)=Ttk(t2)$ and $Tsi(t1)=Tsi(t2)$), expressing the enthalpy of the gas in the tank as a function only of the temperature $Ttk(ti)$ of the gas and the pressure $Ptk(ti)$ of the gas ($Htk$=function of ($Ttk(ti)$; $Ptk(ti)$)), using the perfect gas law or a Van der Waals equation of state expressing the volume of the tank $Vtk(ti)$ (in cubic meters) only as a function of the known or previously estimated variables.

10 Claims, 3 Drawing Sheets

METHOD OF ESTIMATING THE VOLUME OF A PRESSURIZED GAS CONTAINER

CROSS-REFERENCE TO RELATED APPLICATIONS

This application claims the benefit of priority under 35 U.S.C. §119(a) and (b) to French Application No. 0955230, filed Jul. 27, 2009, the entire contents of which are incorporated herein by reference.

BACKGROUND

1. Field of the Invention

The present invention relates to a method of estimating the volume of a pressurized gas tank.

The invention may especially be used in a station for filling bottles or tanks with pressurized gas.

Advantageously, the invention may be applied in stations for filling vehicles with gaseous fuel (especially hydrogen).

2. Related Art

Stations for filling gas tanks for motor vehicles powered by hydrogen are generally adapted to one or more defined types of tanks to be filled.

This is because it is important to know the volume of the tank to be filled in order to achieve optimized filling, safe from the point of view of safety.

In addition, it is generally not possible or not appropriate to measure the pressure and the temperature inside the tank.

Document WO 2005/080201 A1 describes a filling station that estimates the initial gas density in a tank by means of a preliminary pressure measurement and an injection of gas of defined amount. The density is estimated via a model based on regression equations. The station described in that document also estimates the volume of the tank at two different times: two streams of gas are injected and, each time, the pressures are measured and compared with reference pressure ramps in order to estimate the volume of the tank.

Moreover, this known station controls the filling only by the mass of gas transferred.

However, the volume estimated using this method has drawbacks. Apart from the fact that it is necessary to carry out two gas injections and two estimates in succession, according to this method the volume is estimated by comparing the estimated density with tables expressing the volume as a function of reference density curves.

In addition, the gas density estimated according to the above document does not enable the quantity of gas in the tank to be known with sufficient precision. Thus, the initial level in the tank is determined indirectly. This requires knowing in advance the type of tank (volume, material) so as to be able to choose this reference. Moreover, the initial quantity of gas (in number of molecules) is not calculated.

Document EP 1 693 611 A2 describes a filling station that determines the gas density in the tank by a direct measurement in the tank. This method has the same drawbacks as those discussed above (inappropriate measurements in the tank). According to the above document, filling requires the volume of the tank to be known. Thus, this method cannot be used for a tank of unknown volume.

SUMMARY OF THE INVENTION

The object of the present invention is to alleviate all or some of the abovementioned drawbacks of the prior art.

For this purpose, the method according to the invention, which moreover is consistent with the generic definition given in the above preamble, is essentially characterized in that it comprises:
- a step of selectively connecting the tank to at least one pressurized gas source;
- a first step of determining the pressure ($Ptk(t1)$) in the tank;
- a first step of determining the quantity ($ntk(ti)$) of gas contained in the tank at a first time ($t=t1$); then
- a step of transferring a checking stream of gas from a source into the tank, the checking stream flowing over a discrete period ($t2-t1$);
- a second step of determining the pressure ($Ptk(t2)$) in the tank after the checking stream of gas has been transferred;
- a step of determining the quantity ($Q=ntk(t2)-ntk(t1)$) of gas transferred from the source into the tank during flow of the checking stream of gas; and
- a step of calculating the volume ($Vtk$) of the tank by applying the law of conservation of enthalpy ($H$) of the gas (the enthalpy of the gas in the tank after the checking stream of gas has been transferred ($ntk(t2).Htk(t2)$)) is equal to the sum, on the one hand, of the enthalpy of the gas in the tank before the checking stream of gas is transferred ($ntk(t1).Htk(t1)$) and, on the other hand, the enthalpy of the gas transferred from the source in the tank upon transfer of the checking stream of gas (($ntk(t2)-ntk(t1)).Hsi(t1)$), considering that the transfer of the checking stream of gas is adiabatic ($Ttk(t1)=Ttk(t2)$ and $Tsi(t1)=Tsi(t2)$), expressing the enthalpy of the gas in the tank as a function only of the temperature $Ttk(ti)$ of the gas and of the pressure $Ptk(ti)$ of the gas ($Htk$=function of ($Ttk(ti); Ptk(ti)$)), using the perfect gas law or a Van der Waals equation of state expressing the volume of the tank $Vtk(ti)$ (in cubic meters) only as a function of the known variables or those estimated previously ($Ptk(ti)$ in pascals, temperature $Ttk(ti)$ in kelvin and quantity $ntk(ti)$ of gas in moles).

Moreover, embodiments of the invention may have one or more of the following features:
- the law of conservation of enthalpy ($H$) of the gas uses a known model of the enthalpy given by the following equation:

$$H = m \cdot T(ti) \cdot P(ti) + q$$

where $m = A.T(ti) + B$
and $q = C.T(ti) + D$
in which $T(ti)$=temperature (in kelvin) of the gas at time $t=ti$; $P(ti)$=pressure (in pascals) of the gas at time $t=ti$; A (in $J.Pa^{-1}.K^{-1}$), B (in $J.Pa^{-1}$), C (in $J.K^{-1}$) and D (in J) are determined coefficients expressing the enthalpy H of the gas as a function of its pressure and its temperature;

for hydrogen gas, the coefficients A, B, C and D are given by:
A is between $10^{-5}$ and 10 and preferably is equal to $4.2131250 \times 10^{-4}$;
B is between $10^{-5}$ and 10 and preferably is equal to 0.60347812;
C is between $10^{-5}$ and 100 and preferably is equal to 14.700986; and
D is between −1000 and 1000 and is preferably equal to −507.57537;

the at least one pressurized gas source comprises at least one pressurized gas container of known volume intended for transferring gas to the tank by pressure balancing and in that the perfect gas law is used to replace the temperature variable as a function of the pressure, of the volume and of the quantity in the law of conservation of enthalpy H, the volume (Vtk) of the tank being given by the equation;

$$Vtk = \frac{-ntk(t1) \cdot [B \cdot Ptk(t1) + D] - Q \cdot \left[\frac{(A \cdot Psi(t1) + C) \cdot \frac{Psi(t1) \cdot Vsi}{nsi(t1) \cdot R} + B \cdot}{Psi(t1) + D}\right]}{(A \cdot Ptk(t1) + C) \cdot \frac{Ptk(t1)}{R} - (A \cdot Ptk(t2) + C) \cdot \frac{Ptk(t2)}{R}} +$$

$$\frac{ntk(t2) \cdot [B \cdot Ptk(t2) + D]}{(A \cdot Ptk(t1) + C) \cdot \frac{Ptk(t1)}{R} - (A \cdot Ptk(t2) + C) \cdot \frac{Ptk(t2)}{R}}$$

where ntk(t1) the quantity of gas (in moles) contained in the tank (1) before the checking stream of gas is transferred;

ntk(t2)=the quantity of gas (in moles) contained in the tank (1) after the checking stream of gas has been transferred;

Ptk(t1)=the pressure (in pascals) in the tank, determined before the checking stream of gas has been transferred;

Ptk(t2)=the pressure (in pascals) in the tank, determined after the checking stream of gas has been transferred;

Q=the determined quantity (in moles) of gas transferred from the source into the tank (1) during flow of the checking stream of gas;

Psi(t1)=the pressure (in pascals) in the source (Si), determined before the checking stream of gas has been transferred;

Vsi=the known volume (in cubic meters) of the source (Si); and

R=the perfect gas constant in $J \cdot K^{-1} \cdot mol^{-1}$;

the at least one pressurized gas source comprises at least one pressurized gas container of known volume intended for transferring gas to the tank by pressure balancing and in that the Van der Waals equation of state is used to express the temperature variable as a function of the pressure, the volume and the quantity in the law of conservation of enthalpy H;

the method includes a step of estimating the temperature (Ttk(ti)) of the gas in the tank at the time (t=ti) using the estimated volume (Vtk) of the tank and the perfect gas law: Ptk(ti).Vtk=ntk(ti).R.Ttk;

the first step, and likewise the second step, of determining the pressure in the tank comprises a pressure measurement in a line selectively connecting the source to the tank, the pressure measurement being carried out at the inlet of the tank and is considered to be the pressure inside the tank;

the step of transferring the checking stream of gas is carried out over a period (t2−t1) of between 0.1 and 5 seconds and preferably a period (t2−t1) between 0.1 and 3 seconds and even more preferably over a period (t2−t1) of between 0.1 and 1 second;

the step of transferring the checking stream of gas from the source into the tank causes a pressure rise in the tank of between $5 \times 10^4$ Pa and $10^6$ Pa and preferably between $2 \times 10^5$ Pa and $8.5 \times 10^5$ Pa;

the at least one pressurized gas source comprises at least one pressurized gas container of known volume intended to transfer gas into the tank by pressure balancing, the step of determining the quantity (Q=ntk(t2)−ntk(t1)) of gas transferred from the source into the tank during the transfer of the checking stream of gas, comprising:

determination of the pressure in the tank (Si) before the checking stream of gas is transferred (Psi(t1)) and after the checking stream of gas has been transferred (Psi(t2));

determination of the temperature (Tsi(t1)) in the tank (Si) before the checking stream of gas is transferred; and calculation of the quantity Q (in moles) of gas delivered by the container (S1, S2, S3, . . . Si) during flow of the checking stream of gas by applying the perfect gas law to the container (Q=nsi(t2)−nsi(t1)=(Psi(t1).Vsi)/(R.Tsi(t1))−(Psi(t1).Vsi)/(R.Tsi(t1)) and considering that the transfer of the checking stream to the container is adiabatic (Tsi(t2))=Tsi(t1)), the quantity Q of gas (in moles) delivered by the container (S1, S2, S3, . . . Si) during flow of the checking stream of gas being calculated according to the formula: Q=((Psi(t1)−(Psi(t2)).Vsi)/(R.Tsi(t1))

where (Psi(t1)) and (Psi(t2)) are the pressures (in Pa) in the tank (Si) determined respectively before (t) and after (t=t2) the checking stream of gas has been transferred, R is the perfect gas constant (in $J \cdot K^{-1} \cdot mol^{-1}$) and Tsi(t1) is the temperature (in kelvin) in the tank determined before the checking stream has been transferred;

the at east one pressurized gas source comprises at least one pressurized gas container of known volume intended for transferring gas into the tank by pressure balancing, the step of determining the quantity (Qin=ntk(t1)−ntk(t0)) of gas transferred from the source into the tank during flow of the initial stream comprising:

determination of the pressure in the tank (Si) before the initial stream is transferred (Psi(t0)) and after the initial stream has been transferred (Psi(t1));

determination of the temperature (Tsi(t0)) in the tank (Si) before the initial stream has been transferred; and calculation of the quantity Qin of gas (in moles) delivered by the container (Si) during flow of the initial stream by applying the perfect gas law to the container: (Qin=nsi(t0)−nsi(t1)=(Psi(t0).Vsi)/(R.Tsi(to))−(Psi(t1).Vsi)/(R.Tsi(t1)) and considering that the transfer of the initial stream into the container is isothermal (temperature of the gas in the tank is unchanged before and after transfer of the initial stream Tsi (t0))=Tsi(t1)), the quantity Qin of gas (in moles) delivered by the container (S1, S2, S3, . . . Si) during flow of the initial stream being calculated according to the equation: Qin=((Psi (t0)−(Psi(t1)).Vsi)/(R.Tsi(to)) where (Psi(t0)) and (Psi(t1)) are the pressures (in Pa) in the tank (S1, S2, S3, . . . Si) determined before (t=t0) and after (t=t1) the initial stream has been transferred, R is the perfect gas constant (in $J \cdot K^{-1} \cdot mol^{-1}$) and Tsi(t0) is the temperature (in kelvin) in the tank (Si) determined before the initial stream has been transferred;

the quantity of gas (ntk(ti)) contained in the tank is calculated at any moment (t=ti) by adding, to the determined initial quantity (ntk(t0)) of gas contained in the tank, the determined quantity or quantities Qi of gas transferred by the source or sources: ntk(ti)=ntk(t0)+Q(i);

the step of determining the quantity (Q=ntk(t2)−ntk(t1)) of gas transferred from the source into the tank during transfer of the checking stream comprises a measurement via a flowmeter at the connection between the tank and the source;

the step of determining the initial pressure (Ptk(t0)) in the tank comprises a pressure measurement (2) in a line selectively connecting a source (S1, S2, S3, . . . Si) to the tank (1), the pressure measurement (2) being carried out at the inlet of the tank (1) and considered to be the pressure inside the tank (1);

the step of determining the pressure (Ptk(t1)) in the tank after (t=t1) the initial stream has been transferred comprises a pressure measurement in a line selectively connecting a source to the tank, the pressure measurement being carried out at the inlet of the tank and considered to be the pressure inside the tank;

the determination of the temperature ($Tsi(t0)$) in the tank before the initial stream is transferred comprises an ambient temperature measurement close to the container, the measured temperature being considered to be the temperature ($Tsi(t)$) inside the container;

the determination of the pressure in the tank, before the initial stream has been transferred ($Psi(t0)$) and after the initial stream has been transferred ($Psi(t1)$), is determined by a pressure measurement in a line selectively connecting the container to the tank, the pressure measurement being carried out at the outlet of the container and considered to be the pressure inside the container;

the step of determining the quantity ($Qin=ntk(t1)-ntk(t0)$) of gas transferred from the source into the tank during flow of the initial stream comprises a measurement via a flowmeter at the connection between the tank and the source;

the step of transferring the initial stream of gas from a source into the tank causes a pressure rise in the tank of between $5\times10^5$ Pa and $10^6$ Pa and preferably between $2\times10^5$ Pa and $8.5\times10^5$ Pa;

the connection from the tank to the source includes at least one gas transfer control valve and the step of determining the quantity ($Qin=ntk(t1)-ntk(t0)$) of gas transferred from the source into the tank during flow of the initial stream comprises an estimation of the flow passing through the valve as a function of its degree of opening; and the connection from the tank to the source includes at least one gas transfer control valve and the step of determining the quantity ($Q=ntk(t2)-ntk(t1)$) of gas transferred from the source into the tank during flow of the checking stream comprises an estimation of the flow passing through the valve as a function of its degree of opening.

The invention may also relate to any alternative device or method comprising any combination of the features above or below. In particular, the invention may relate to a filling station that includes checking, calculation and control electronics using the method according to any one of the features above or below.

BRIEF DESCRIPTION OF THE FIGURES

Other features and advantages will become apparent on reading the following description, given with reference to the figures in which.

DETAILED DESCRIPTION OF THE INVENTION

Figure 1:
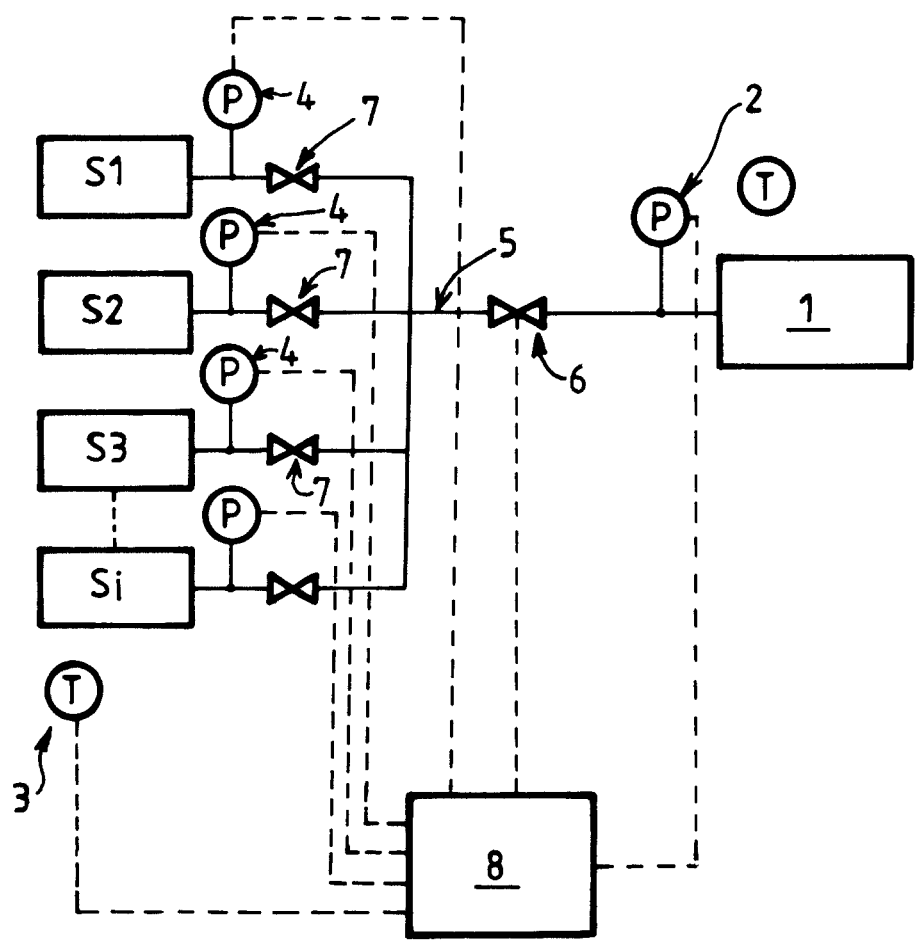
FIG. 1 shows a schematic partial view illustrating the structure and the operation of a filling station according to one embodiment of the invention.

As shown in FIG. 1, the method may be implemented by a filling station comprising, for example, several pressurized gas source containers $S1, S2, \ldots, Si$. Conventionally, the containers $S1$ to $Si$ my be used for filling a tank 1 by pressure balancing ("in cascade", i.e. using several containers having successively higher storage pressures). As a variant, or additionally, the station may use a gas compressor or any means capable of delivering gas at high pressure (for example between 200 and 850 bar). The source containers $S1$ to $Si$ are connected in parallel to a common filling line 5 that can be selectively connected to one or more tanks to be filled. Respective valves 7 may be provided for controlling the supply of gas from the containers $S1$ to $Si$ to the common line 5. In addition, one or more valves 6 may be provided for controlling the flow of gas in the line 5. An electronic control software 8 may be provided for carrying out all or some of the process.

To calculate or estimate the volume Vtk of the tank 1, the method uses the quantity $ntk(ti)$ of gas present in the tank 1.

This quantity of gas $ntk(ti)$ (for example in moles) already present in the tank 1 may be known in advance or may be calculated prior to the method used to estimate the volume of the tank Vtk.

To calculate the volume Vtk of the tank, the method requires a stream of gas called the "checking stream of gas" or "checking stream" to be transferred from a source Si to the tank 1.

Figure 3:
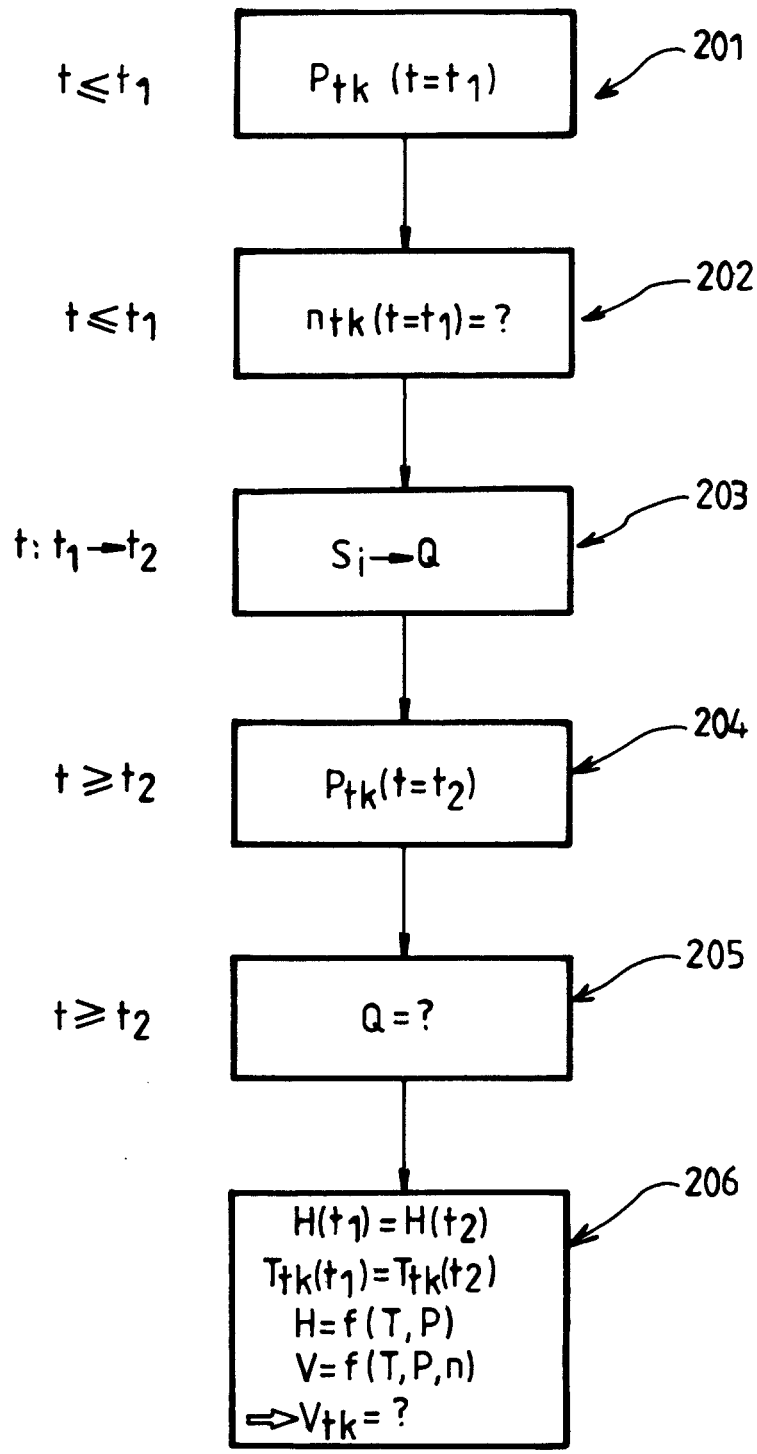
FIG. 3 shows, partially and schematically, a succession of steps that can be implemented according to the invention.

Firstly, the station determines, at 2, the pressure RIO) in the tank 1 (cf. step 201 in FIG. 3). For example, this determination of the pressure $Ptk(t1)$ in the tank 1 preferably comprises a pressure measurement (sensor 2) in the line 5 connected to the tank 1. In other words, the pressure measurement 2 is carried out at the inlet/outlet of the tank 1 and is considered to be the pressure inside the tank 1.

As explained above, the quantity $ntk(t1)$ of gas contained in the tank 1 before the checking stream has been transferred is assumed to be known by the station (step 202 in FIG. 3).

The station then transfers the checking stream of gas from a source Si into the tank 1 (step 203 in FIG. 3). The checking stream flows over a discrete period ($t2-t1$), for example between 0.1 and 5 seconds, or preferably between 0.1 and 3 seconds or even more preferably between 0.1 and 1 second. For example, transfer of the checking stream of gas causes a pressure rise in the tank of between $5\times10^4$ Pa and $10^6$ Pa and preferably between $2\times10^5$ Pa and $8.5\times10^5$ Pa.

The station then carries out a new determination 2 of the pressure $Ptk(t2)$ in the tank 1 after the checking stream of gas has been transferred (step 204 in FIG. 3). This new determination 2 of the pressure $Ptk(t2)$ in the tank 1 may of course be carried out in the same way as in step 201 (before the checking stream has been transferred).

The station then determines the quantity $Q=ntk(t2)-ntk(t1)$ of gas transferred from the source Si into the tank 1 during flow of the checking stream of gas (step 205 in FIG. 3). This determination may be carried out by various methods explained below.

For example, the station may determine the quantity $Q=ntk(t2)-ntk(t1)$ of gas transferred (in moles) from the source Si into the tank 1 during flow of the checking stream via a flowmeter at the connection between the tank 1 and the source Si (for example in the line 5). As a variant, the determination of the quantity Q of gas transferred during flow of the checking stream is an estimate based on a model of the valve 6 (the degree of opening of the valve 6 is used to estimate the flow transferred)

According to another possibility, the quantity Q transferred during flow of the checking stream may be determined by a calculation using a known equation of state for the gas (perfect gas law or Van der Waals equation of state). The equation of state enables the quantity of gas (in moles) to be determined as a function of its pressure (in Pa), its volume (in m³) and its temperature (in kelvin).

According to one advantageous feature, it is considered that the transfer of the initial stream in the tank is isothermal ($Tsi(t0)=Tsi(t1)$). In this way, the quantity Q transferred during flow of the checking stream may be uniquely expressed as a function of known variables or those estimated beforehand.

Psi(t1) and Psi(t2) are the pressures (in Pa) in the tank Si determined before (t=t1) and after (t=t2) the checking stream has been transferred;

Tsi(t1) is the temperature (in kelvin) in the tank, determined during transfer of the initial stream;

Vi is the known volume (in m³) of the container Si; and

R is the perfect gas constant (in J.K⁻¹.mol⁻¹).

The temperature Tsi(t1) in the tank Si during transfer of the checking stream may be determined for example, by measuring, at 3, the ambient temperature near the container Si. This ambient temperature is considered to be the temperature Tsi (t1) inside the container Si. Of course, this ambient temperature measurement may be carried out during or after the checking stream has been transferred (the temperature just before, during and just after transfer of the initial stream being considered constant).

Previously in the case of the tank 1, the pressures in the tank Si, Psi(t1) before the checking stream has been transferred and Psi(t2) after the checking stream has been transferred, may each be determined by a pressure measurement 4 at the inlet/outlet of the container Si and are considered to be the pressures inside the container.

Thus, using for example the equation of state for perfect gases in the tank, the quantity Q forming the initial stream is obtained by:

$$Q=nsi(t1)-nsi(t2)=((Psi(t1)-(Psi(t2))\cdot Vsi)/(R\cdot Tsi(t1)),$$

where:

R is the perfect gas constant (in J·K⁻¹·mol⁻¹);

nsi(t1) and nsi(t2) are the quantities of gas (in moles) in the tank before and after the initial stream has been transferred respectively;

Psi(t1) and Psi(t2) are the pressures (in Pa) in the tank Si before and after the initial stream has been transferred; and Tsi(t1) is the temperature (in kelvin) in the tank Si before (or during) transfer of the initial stream.

Thus, this quantity Q may be easily calculated from easily measurable or available variables.

Of course, this quantity of gas Q transferred during flow of the checking stream may be calculated using the Van der Waals equation of state for the gas.

The quantity Q of gas transferred during flow of the checking stream then enables the volume Vtk of the tank 1 to be calculated (step 206 in FIG. 3).

To estimate this volume Vtk by calculation, the method uses the law of conservation of enthalpy H of the gas. This law means that the enthalpy of the gas in the tank 1 after the checking stream of gas has been transferred, i.e. ntk(t2).Htk (t2), is equal to the sum, on the one hand, of the enthalpy of the gas in the tank 1 before the checking stream of gas has been transferred, i.e. ntk(t1).Htk(t1), and, on the other hand, of the enthalpy of the gas transferred from the source Si into the tank during transfer of the checking stream of gas, i.e. (ntk(t2)−ntk(t1)).Hsi(t1).

In addition, according to the method, transfer of the checking stream of gas is considered adiabatic (Ttk(t1)=Ttk(t2) and Tsi(t1)=Tsi(t2)).

By conventionally expressing the enthalpy Htk of the gas in the tank as a function only of the temperature Ttk(ti) of the gas and the pressure Ptk(ti) of the gas (Htk=function of (Ttk(ti); Ptk(ti)) and using the perfect gas law or a Van der Waals equation of state, the method enables the volume Vtk of the tank to be expressed only as a function of the known or previously estimated variables.

For example, a known model of the enthalpy of a gas is given by the following expression:

$$H=m\cdot T(ti)\cdot P(ti)+q$$

where m=A.T(ti)+B and q=C.T(ti)+D (Ptk(ti) is the pressure in pascals, Ttk(ti) is the temperature in kelvin and ntk(ti) is the quantity in moles)

in which T(ti)=temperature (in kelvin) of the gas at time t=ti; P(ti)=pressure (in pascals) of the gas at time t=ti; A (in J.Pa⁻¹.K⁻¹), B (in J.Pa⁻¹), C (in J.K⁻¹) and D (in J) are determined as coefficients which are calculated or well known from models or tables expressing the enthalpy H of the gas as a function of its pressure and its temperature.

For example, for hydrogen gas ("NIST" data), the coefficients A, B, C and D can be given by:

A is between 10⁻⁵ and 10 and preferably is equal to 42131250×10⁻⁴;

B is between 10⁻⁵ and 10 and preferably is equal to 0.60347812;

C is between 10⁻⁵ and 100 and preferably is equal to 14.700936; and

D is between −1000 and 1000 and is preferably equal to −507.57537.

Using this expression of enthalpy before (t=t1) and after (t=t2) the checking stream has been transferred, the enthalpy of the tank (Htk(ti)=enthalpy of the container at time ti) is given by:

$$Htk(t1)=(A\cdot Ptk((t1)+C)\cdot Ttk(t1)+B\cdot Ptk(t1)+D$$

$$Htk(t2)=(A\cdot Ptk(t2)+C)\cdot Ttk(t2)+B\cdot Ptk(t2)+D$$

and for the container Si (Hsi(ti)=enthalpy of the container at time ti) is given by;

$$HSi(t1)=(A\cdot Psi(t1)+C)\cdot Tsi(t1)+b\cdot Psi(t1)+D$$

$$HSi(t2)=(A\cdot Psi(t2)+C)\cdot Tsi(t2)+B\cdot Psi(t2)+D.$$

As seen above, the conservation of enthalpy may be expressed as:

$$ntk(t2)\cdot Htk(t2)=ntk(t1)\cdot Htk(t1)+(ntk(t2)-ntk(t1))\cdot Hsi(t1).$$

1. By replacing the enthalpy H by its expression above (i.e. H=mT.P+q) and by replacing the temperature as a function of the pressure, the volume and the quantity (perfect gas equation T=PV/RT), the following formula is obtained:

$$Vtk = \frac{-ntk(t1)\cdot[B\cdot Ptk(t1_1)+D]-Q\cdot\left[\begin{array}{c}(A\cdot Psi(t1)+C)\cdot\\ \frac{Psi(t1)\cdot Vsi}{nsi(t1)\cdot R}+B\cdot\\ Psi(t1)+D\end{array}\right]}{(A\cdot Ptk(t1)+C)\cdot\frac{Ptk(t1)}{R}-(A\cdot Ptk(t2)+C)\cdot\frac{Ptk(t2)}{R}} +$$

$$\frac{ntk(t2)\cdot[B\cdot Ptk(t2)+D]}{(A\cdot Ptk(t1)+C)\cdot\frac{Ptk(t1)}{R}-(A\cdot Ptk(t2)+C)\cdot\frac{Ptk(t2)}{R}}$$

where:

ntk(t1)=the quantity of gas (in moles) contained in the tank (1) before the checking stream of gas is transferred;

ntk(t2)=the quantity of gas (in moles) contained in the tank (1) after the checking stream of gas has been transferred;

Ptk(t1)=the pressure (in pascals) in the tank, determined before the checking stream of gas has been transferred;

Ptk(t2)=the pressure (in pascals) in the tank, determined after the checking stream of gas has been transferred;

Q=the determined quantity (in moles) of gas transferred from the source into the tank (1) during flow of the checking stream of gas;

Psi(t1)=the pressure (in pascals) in the source (Si), determined before the checking stream of gas has been transferred;

Vsi=the known volume (in cubic meters) of the source (Si); and

R=the perfect gas constant in $J \cdot K^{-1} \cdot mol^{-1}$.

In this way, the method thus provides a very precise estimate of the volume Vtk of the tank to be filled.

Knowing the volume Vtk of the tank, the filling station can readily calculate the temperature Ttk(ti) of the gas in the tank at any instant (using the chosen equation of state and via the pressure Ptk(ti) and quantity of gas ntk(ti) in the tank calculated or measured beforehand).

As a variant, in the law of conservation of enthalpy, it is possible to use the Van der Waals equation of state in order to replace the temperature as a function of the pressure, the volume and the quantity.

In this case, the volume Vtk of the tank 1 is given by an equation involving the known or previously determined variables. This equation may be solved for example by numerical calculation.

It will be understood that the method according to the invention allows the filling station to be adapted to any type of tank or bottle to be filled, even tanks of unknown volume.

Thus, the method enables the filling operations to be optimized (in terms of filling level and filling rate), also it being possible to check the estimated temperature in the tank. The method requires no communication (temperature, volume or pressure measurements) inside a tank or a vehicle containing this tank.

A single stream of gas enables the volume to be estimated precisely.

In the above method, it was pointed out that the quantity of gas contained in the tank (before the checking stream was transferred) has to be known.

An advantageous (and optional) method of estimating the quantity of gas ntk(ti) contained in a pressurized gas tank 1 of unknown volume Vtk will be described below.

Prior Estimation of the Quantity of Gas Contained in the Tank:

This method may especially be used before implementing the above method of calculating the volume Vtk (that is to say before the checking stream is transferred).

Figure 2:
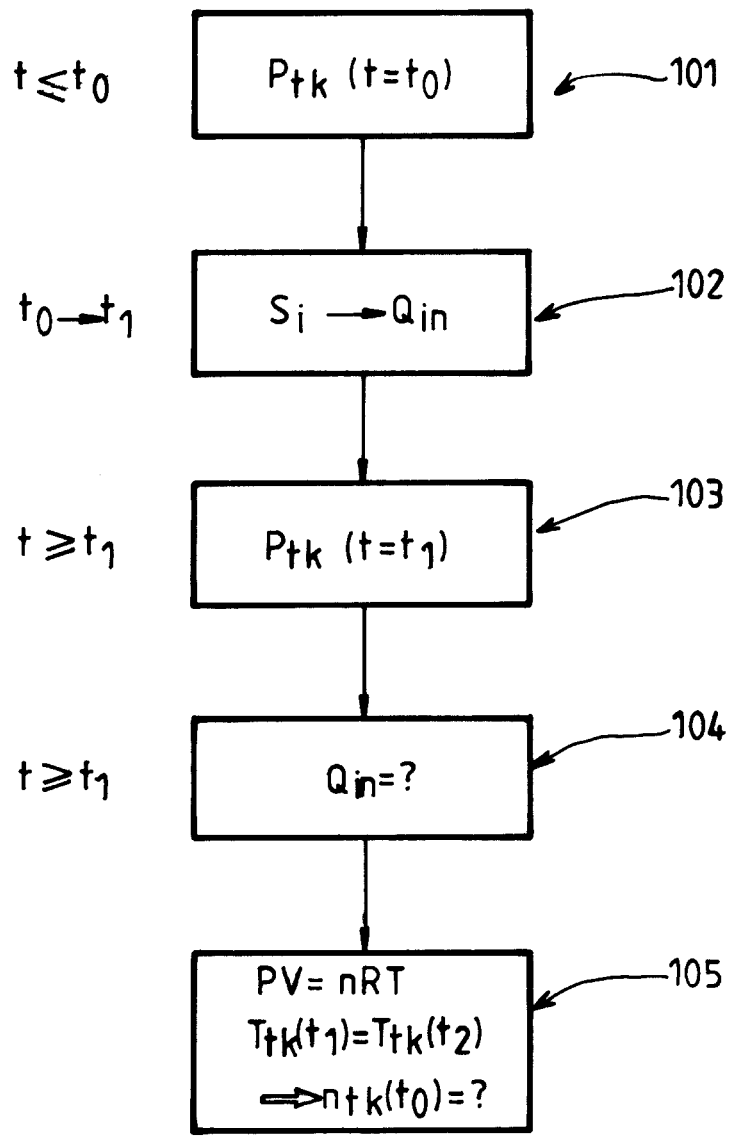
FIG. 2 shows, partially and schematically, a succession of steps that can be implemented according to the invention.

To estimate the quantity of gas contained in the tank, the method may include a step 2 of determining the initial pressure Ptk(t0) in the tank 1 (step 101 in FIG. 2).

This determination of the initial pressure Ptk(t0) in the tank 1 may involve a pressure measurement (by sensor 2) in the line 5 connected to the tank 1, that is to say the pressure measurement 2 is carried out at the inlet/outlet of the tank 1 and is considered to be the pressure inside the tank 1.

The tank 1 is selectively connected to at least one pressurized gas source Si and the station transfers an initial stream of gas from the source Si into the tank 1 (step 102 in FIG. 2).

At time t=t0, the initial stream flows over a discrete period (t1-t0) of between 0.1 and 5 seconds and preferably 0.1 and 3 seconds and even more preferably between 0.1 and 1 second.

For example, step 102 of transferring the initial stream of gas from the source Si into the tank 1 causes a limited pressure rise in the tank 1 of between $5 \times 10^4$ Pa and $10^6$ Pa and preferably between $2 \times 10^5$ Pa and $8.5 \times 10^5$ Pa.

The station then determines the pressure Ptk(t1) in the tank 1 after the initial stream has been transferred (step 13 in FIG. 2). As previously, the step of determining the pressure Ptk(t1) in the tank 1 at t=t1 after the initial stream has been transferred may comprise a pressure measurement 2 at the inlet/outlet of the tank 1.

The station firstly determines the quantity Qin=ntk(t1)−ntk(t0) of gas transferred from the source Si into the tank 1 during flow of the initial stream (step 104 in FIG. 2). This step of determining the quantity Qin of gas transferred from the source Si into the tank 1 may also be carried out by a flowmeter at the connection between the tank 1 and the source Si (for example at the line 5). As a variant, the determination of the quantity Qin of gas transferred during flow of the initial stream is an estimate based on a model of the valve 6 (the degree of opening of the valve 6 enables the transferred flow to be estimated).

According to another possibility, the quantity Qin transferred during flow of the initial stream may be determined by calculation, using a known equation of state for the gas (perfect gas law or the Van der Wads equation of state). The equation of state enables the quantity of gas (in moles) to be expressed as a function of its pressure (in Pa), its volume (in $m^3$) and its temperature (in kelvin). According to one advantageous feature, it is considered that the transfer of the initial stream in the tank is isothermal (Tsi(to))=Tsi(t1)). In this way, the quantity Qin transferred during flow of the initial stream may be uniquely expressed as a function of known variables or those estimated beforehand:

Psi(t0)) and Psi(t1) are the pressures (in Pa) in the tank Si determined before (t=t0) and after (t=t1) the initial stream has been transferred;

Tsi(t0) is the temperature (in kelvin) in the tank, determined before the initial stream is transferred;

Vi is the known volume (in $m^3$) of the container Si; and

R is the perfect gas constant (in $J.K^{-1}.mol^{-1}$).

The temperature Tsi(t0) in the tank Si before the initial stream is transferred may be determined, for example, by measuring the ambient temperature near the container Si. This ambient temperature is considered to be the temperature Tsi(t0) inside the container Si. Of course, this ambient temperature measurement may be carried out during or after the initial stream has been transferred (the temperature just before, during and just after transfer of the initial stream being considered constant).

As previously in the case of the tank 1, the pressures in the tank Si, before Psi(t0) and after Psi(t1) the initial stream has been transferred, may each be determined by a pressure measurement 4 at the inlet/outlet of the container Si and are considered to be the pressures inside the container.

Thus, using for example the equation of state for perfect gases in the tank, the quantity Q forming the initial stream is obtained by:

$$Qin = nsi(t0) - nsi(t1) = ((Psi(t0) - (Psi(t1)) \cdot Vsi) / (R \cdot Tsi(t0))) \quad \text{(equation I)}$$

where:

R is the perfect gas constant (in $J \cdot K^{-1} \cdot mol^{-1}$), nsi(t0) and nsi(t1) are the quantities of gas (in moles) in the tank before and after the initial stream has been transferred, respectively;

Psi(t0) and Psi(t1) are the pressures (in Pa) in the tank Si before and after the initial stream has been transferred; and Tsi(t0) is the temperature (in kelvin) in the tank Si before (or during) transfer of the initial stream.

Of course, this quantity of gas Qin transferred during flow of the initial stream may be calculated using the Van der Waals equation of state for the gas.

When this transferred quantity of gas Qin is available, the station may then calculate the initial quantity ntk(t0) of gas contained in the tank 1 before the initial stream is transferred (step 105 in FIG. 2). In fact, this initial quantity ntk(t0) may be calculated by applying a known equation of state for the gas (perfect gas equation or Van der Waals equation of state) expressing the quantity of gas in moles as a function of its pressure (in Pa), its volume (in m$^3$) and its temperature (in kelvin). The method also considers that the transfer of the initial stream is isothermal in the tank, i.e. Ttk(t0)=Ttk(t1), and uses the quantity Qin of transferred gas determined in the previous step.

More precisely, the initial quantity ntk(t0) of gas (in moles) may be calculated only as a function of known or already estimated variables, namely:

Ptk(t0), the initial pressure (in pascals) in the tank;

Qin, the determined quantity of gas (in moles) transferred during flow of the initial stream; and Ptk(t1), the gas pressure (in pascals) in the tank, determined after the initial stream of gas has been transferred.

For example, using the perfect gas equation for the gas in the tank at times t0 and t1, the following may be written:

$$Ptk(t0) \cdot Vtk = ntk(t0) \cdot R \cdot Ttk(t0) \text{ and } Ptk(t1) \cdot Vtk = ntk(t1) \cdot R \cdot Ttk(t1)$$

where Vtk is the unknown volume (in m$^3$) of the tank;

Ttk(ti) is the unknown temperature (in kelvin) in the tank at time ti;

ntk(ti) is the quantity (in moles) of gas in the tank at time ti.

Because the transfer during flow of the initial stream is isothermal (Ttk(t0)=Ttk(t1)), therefore:

$$ntk(t1) - ntk(t0) = ((Ptk(t1) - Ptk(t0)) \cdot Vtk) / (R \cdot Ttk(t0)) \quad \text{(equation II)}$$

Using the perfect gas equation again in the tank and replacing Vtk(Ttk(t0) as a function of Qin and (Psi(t1)−Psi(t0)), the following are obtained:

$$ntk(t0) = (Ptk(t0) \cdot Vtk) / (R \cdot Ttk(t0)) \quad \text{(equation III)}$$
$$= (Qin \cdot Ptk(t0)) / (Ptk(t1) - Ptk(t0))$$

Using equation (I) and equation (III), it is therefore possible to calculate the quantity of gas in the tank 1 at any time t=ti by adding, to the calculated initial quantity ntk(to), the quantity or quantities added by the container or containers Si.

As a variant, the initial quantity ntk(t0) of gas contained in the tank 1 before the initial stream is transferred may be calculated using the Van der Waals equation of state:

$$P_{tk}(t_i) \cdot = \frac{n_{tk}(t_i) \cdot R \cdot T_{tk}(t_i)}{V_{tk} - b_{vdw} \cdot n_{tk}(t_i)} - \frac{a_{vdw}}{\left(\frac{V_{tk}}{n_{tk}(t_i)}\right)^2}$$

where:

$a_{vdw}$=a known coefficient comprising in the case of hydrogen, preferably equal to $1.1900982 \cdot 10^{-2}$ Pa.m$^2$.mol$^{-1}$; and $b_{vdw}$=a known coefficient, lying in the case of hydrogen preferably equal to $1.7936793 \times 10^{-5}$ Pa.m$^3$.mol$^{-1}$.

In this case too, the initial quantity ntk(t0) of gas (in moles) may be calculated only as a function of known or already estimated variables.

With the Van der Waals equation of state, it is also possible to express the pressure Ptk(ti) of the gas at time ti in the tank 1 as a function of the quantity ntk(ti) of gas, the volume Vtk and the temperature Ttk(ti) according to the equation:

$$P_{tk}(t_i) = \frac{n_{tk}(t_i) \cdot R \cdot T_{tk}(t_i) \cdot V_{tk}^2 - a_{vdw} \cdot n_{tk}(t_i)^2 (V_{tk} - b_{vdw} \cdot n_{tk}(t_i))}{V_{tk}^2 \cdot (V_{tk} - b_{vdw} \cdot n_{tk}(t_i))}$$

The quantity of gas may then be expressed by the following polynomial expression:

$$n_{tk}(t_i)^3 \cdot b_{vdw} \cdot (P_{tk}(t_i) \cdot V_{tk}^2 + a_{vdw}) - n_{tk}(t_i)^2 \cdot a_{vdw} \cdot V_{tk} + n_{tk}(t_i) \cdot V_{tk}^2 \cdot R \cdot T_{tk} - P_{tk}(t_i) \cdot V_{tk}^3 = 0$$

Using the following notations:

$a = b_{vwd} \cdot (P_{tk}(t_i) \cdot V_{tk}^2 + a_{vdw})$; $b = -a_{vdw} \cdot V_{tk}$; $c = V_{tk}^2 \cdot R \cdot T_{tk}$; $d = -P_{tk}(t_i) \cdot V_{tk}^3$; $x = n_{tk}(t_i)$ the following explicit expression is obtained:

$a \neq 0$, $$x = \frac{1}{3\sqrt[3]{2}\,a}\left(\left(\sqrt{\left(\frac{-27a^2d+}{9abc-2b^3}\right)^2 + 4(3ac-b^2)^3} - \frac{}{27a^2d + 9abc - 2b^3}\right)^{\wedge}(1/3) - \right.$$
$$\left(\sqrt[3]{2}\,(3ac - b^2)\right) /$$
$$\left.\left(3a\left(\sqrt{\left(\frac{-27a^2d+}{9abc-2b^3}\right)^2 + 4(3ac-b^2)^3} - \frac{}{27a^2d + 9abc - 2b^3}\right)^{\wedge}(1/3)\right)\right) - \frac{b}{3a}$$

As previously, using the quantity Qin transferred during flow of the initial stream of gas, the initial quantity ntk(to) of gas contained in the tank 1 before the initial stream is transferred my be expressed only as a function of known or already estimated variables (Ptk(t0), Qin and Ptk(t1)).

Knowing the initial quantity of gas (ntk(t0)), the station may then calculate the quantity ntk(ti) contained in the tank 1 at any instant ti. This is because it is sufficient to add, to the estimated initial quantity ntk(t0) of gas, the quantity or quantities of gas transferred by the source or sources (S1, S2, S3, ..., Si).

It will be understood that the method according to the invention enables the filling station to be adapted to any type of tank or bottle to be filled, even unknown tanks (unknown initial volume and content).

The method thus makes it possible to optimize the filling operations (in terms of filling level and filling rate), also making it possible to check the estimated temperature in the tank. The method requires no communication (temperature, volume and pressure measurements) inside a tank or a vehicle containing this tank.

A single stream of gas enables the initial quantity contained in the tank to be estimated and a single stream of gas enables the volume to be estimated.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method of estimating a volume (Vtk) of a pressurized gas tank, comprising:
   a) a step of determining a pressure (Ptk(t1)) in the tank,
   b) a step of determining a quantity (ntk(ti)) of gas contained in the tank at a first time (t=t1),
   c) a step of transferring a checking stream of gas into the tank over a discrete period (t2−t1) from a pressurized gas source in fluid communication with the tank thereby increasing the pressure in the tank to produce a further pressurized tank,
   d) a step of determining a pressure (Ptk(t2)) in the further pressurized tank,
   e) a step of determining a quantity (Q=ntk(t2)−ntk(t1)) of gas transferred from the source into the tank during step c), and
   f) a step of calculating the estimated volume of the tank based on:
      the pressure (Ptk(t1)) in the tank determined in step a),
      the quantity (ntk(ti)) of gas contained in the tank at a first time (t=t1) determined in step b),
      the pressure (Ptk(t2)) in the further pressurized tank determined in step d), and
      the quantity (Q=ntk(t2)−ntk(t1)) of gas transferred from the source into the tank determined in step e),
   g) a step of filling the further pressurized gas tank based on the estimated volume (Vtk) to a desired final quantity of the gas in the pressurized gas tank to produce a final pressurized gas tank,
wherein in step f), the calculation assumes that step c) is an adiabatic process to produce the further pressurized tank, wherein the calculation of step f) assumes an enthalpy of the gas in the tank after the checking stream of gas has been transferred (ntk(t2).Htk(t2)) is equal to the sum of a) the enthalpy of the gas in the tank before the checking stream of gas is transferred (ntk(t1).Htk(t1)) and b) the enthalpy of the gas transferred from the source in the tank upon transfer of the checking stream of gas ((ntk(t2)−ntk(t1)).Hsi(t1)), and wherein the calculation uses a model of the enthalpy given by the following equation:

$$H = m \cdot T(ti) \cdot P(ti) + q$$

where m=A.T(ti)+B
and q=C.T(ti)+D
in which T(ti)=temperature (in kelvin) of the gas at time t=ti; P(ti)=pressure (in pascals) of the gas at time t=ti; A (in $J.Pa^{-1}.K^{-1}$), B (in $J.Pa^{-1}$), C (in $J.K^{-1}$) and D (in J) are determined coefficients expressing the enthalpy H of the gas as a function of its pressure and its temperature.

2. The method of claim 1, wherein, the pressurized gas is a hydrogen gas and the coefficients A, B, C and D are given by:
   A is between $10^{-5}$ and 10,
   B is between $10^{-5}$ and 10,
   C is between $10^{-5}$ and 100, and
   D is between −1000 and 1000.

3. The method of claim 1, wherein the at least one pressurized gas source comprises at least one pressurized gas container of known volume intended for transferring gas to the tank by pressure balancing and the Van der Waals equation of state is used to express the temperature variable as a function of the pressure, the volume and the quantity.

4. The method of claim 1, wherein the method includes a step of estimating a temperature (Ttk(ti)) of the gas in the tank at the time (t=ti) using the estimated volume (Vtk) of the tank and assuming: Ptk(ti).Vtk=ntk(ti).R.Ttk.

5. A method of estimating a volume (Vtk) of a pressurized gas tank, comprising:
   a) a step of determining a pressure (Ptk(t1)) in the tank,
   b) a step of determining a quantity (ntk(ti)) of gas contained in the tank at a first time (t=t1),
   c) a step of transferring a checking stream of gas into the tank over a discrete period (t2−t1) from a pressurized gas source in fluid communication with the tank thereby increasing the pressure in the tank to produce a further pressurized tank,
   d) a step of determining a pressure (Ptk(t2)) in the further pressurized tank,
   e) a step of determining a quantity (Q=ntk(t2)−ntk(t1)) of gas transferred from the source into the tank during step c), and
   f) a step of calculating the estimated volume of the tank based on:
      the pressure (Ptk(t1)) in the tank determined in step a),
      the quantity (ntk(ti)) of gas contained in the tank at a first time (t=t1) determined in step b),
      the pressure (Ptk(t2)) in the further pressurized tank determined in step d), and
      the quantity (Q=ntk(t2)−ntk(t1)) of gas transferred from the source into the tank determined in step e),
   g) a step of filling the further pressurized gas tank based on the estimated volume (Vtk) to a desired final quantity of the gas in the pressurized gas tank to produce a final pressurized gas tank,
wherein in step f), the calculation assumes that step c) is an adiabatic process to produce the further pressurized tank, wherein the calculation of step f) assumes an enthalpy of the gas in the tank after the checking stream of gas has been transferred (ntk(t2).Htk(t2)) is equal to the sum of a) the enthalpy of the gas in the tank before the checking stream of gas is transferred (ntk(t1).Htk(t1)) and b) the enthalpy of the gas transferred from the source in the tank upon transfer of the checking stream of gas ((ntk(t2)−ntk(t1)).Hsi(t1)), and wherein the at least one pressurized gas source comprises at least one pressurized gas container of known volume intended for transferring gas to the tank by pressure balancing and the calculation is:

$$Vtk = \frac{-ntk(t1) \cdot [B \cdot Ptk(t1) + D] - Q \cdot \left[ (A \cdot Psi(t1) + C) \cdot \frac{Psi(t1) \cdot Vsi}{nsi(t1) \cdot R} + B \cdot Psi(t1) + D \right]}{(A \cdot Ptk(t1) + C) \cdot \frac{Ptk(t1)}{R} - (A \cdot Ptk(t2) + C) \cdot \frac{Ptk(t2)}{R}} + \frac{ntk(t2) \cdot [B \cdot Ptk(t2) + D]}{(A \cdot Ptk(t1) + C) \cdot \frac{Ptk(t1)}{R} - (A \cdot Ptk(t2) + C) \cdot \frac{Ptk(t2)}{R}}$$

wherein:
   ntk(t1)=the quantity of gas (in moles) contained in the tank before the checking stream of gas is transferred;
   ntk(t2)=the quantity of gas (in moles) contained in the tank after the checking stream of gas has been transferred;
   Ptk(t1)=the pressure (in pascals) in the tank, determined before the checking stream of gas has been transferred;
   Ptk(t2)=the pressure (in pascals) in the tank, determined after the checking stream of gas has been transferred;

Q=the determined quantity (in moles) of gas transferred from the source into the tank during flow of the checking stream of gas;

Psi(t1)=the pressure (in pascals) in the pressurized gas source, determined before the checking stream of gas has been transferred;

Vsi=the known volume (in cubic meters) of the source; and

R=the perfect gas constant in $J \cdot K^{-1} \cdot mol^{-1}$.

6. A method of estimating a volume (Vtk) of a pressurized gas tank, comprising:
   a) a step of determining a pressure (Ptk(t1)) in the tank,
   b) a step of determining a quantity (ntk(ti)) of gas contained in the tank at a first time (t=t1),
   c) a step of transferring a checking stream of gas into the tank over a discrete period (t2−t1) from a pressurized gas source in fluid communication with the tank thereby increasing the pressure in the tank to produce a further pressurized tank,
   d) a step of determining a pressure (Ptk(t2)) in the further pressurized gas tank,
   e) a step of determining a quantity (Q=ntk(t2)−ntk(t1)) of gas transferred from the source into the tank during step c), whereby the volume (Vtk) of the pressurized gas tank may be estimated,
   f) a step of filling the further pressurized gas tank based on the estimated volume (Vtk) to a desired final quantity of the gas in the pressurized gas tank to produce a final pressurized gas tank, wherein the step b) of determining the quantity (ntk(t1)) of gas contained in the tank (1) at a first time (t=t1) comprises:
   A) a step of operably connecting of the tank to at least one pressurized gas source,
   B) a step of determining an initial pressure (Ptk(t0)) in the tank,
   C) a step of transferring of an initial stream of gas from the pressurized gas source into the tank over a discrete period (t1−t0) to produce a further pressurized tank,
   D) a step of determining the pressure (Ptk(t1)) in the further pressurized tank,
   E) a step of determining of a quantity (Qin=ntk(t1)−ntk(t0)) of gas transferred from the pressurized gas source into the tank, and
   F) a step of calculating an initial quantity (ntk(t0)) of gas contained in the tank according to the equation:

$$ntk(t0)=(Ptk(t0) \cdot Qin)/(Ptk(t1)-Ptk(t0)),$$

wherein Ptk(t0) is the initial pressure (in pascals) in the tank, determined before the initial stream of gas has been transferred, Ptk(t1) is the gas pressure (in pascals) in the tank, determined after the initial stream of gas has been transferred and Qin is the determined quantity of gas (in moles) transferred from the source into the tank during flow of the initial stream, and wherein step c) is assumed to be an isothermal process.

7. The method of claim 6, wherein the quantity of gas (ntk(ti)) contained in the tank is calculated at any moment (t=ti) by adding, to the determined initial quantity (ntk(t0)) of gas contained in the tank, a determined quantity or quantities (Q(i)) of gas transferred from the pressurized gas source.

8. The method of claim 6, wherein the step e) of determining the quantity (Q=ntk(t2)−ntk(t1)) of gas transferred from the pressurized source into the tank during transfer of the checking stream comprises a measurement via a flowmeter at the connection between the tank and the pressurized gas source.

9. The method of claim 6, wherein the desired final quantity of the gas in the pressurized gas tank is based on a known safety parameter.

10. The method of claim 9 wherein the gas comprises hydrogen.

* * * * *